United States Patent
Hansen et al.

(10) Patent No.: US 10,363,525 B2
(45) Date of Patent: Jul. 30, 2019

(54) FILTRATION MODULE

(71) Applicant: ALFA LAVAL CORPORATE AB, Lund (SE)

(72) Inventors: Franck Hansen, Nakskov (DK); Nicolas Heinen, Kgs. Lyngby (DK)

(73) Assignee: ALFA LAVAL CORPORATE AB, Lund (SE)

( * ) Notice: Subject to any disclaimer, the term of this patent is extended or adjusted under 35 U.S.C. 154(b) by 253 days.

(21) Appl. No.: 15/109,754

(22) PCT Filed: Feb. 9, 2015

(86) PCT No.: PCT/EP2015/052611
§ 371 (c)(1),
(2) Date: Jul. 5, 2016

(87) PCT Pub. No.: WO2015/118144
PCT Pub. Date: Aug. 13, 2015

(65) Prior Publication Data
US 2016/0339391 A1    Nov. 24, 2016

(30) Foreign Application Priority Data
Feb. 10, 2014 (EP) .................................. 14154446

(51) Int. Cl.
*B01D 63/08* (2006.01)
*B01D 61/14* (2006.01)
(Continued)

(52) U.S. Cl.
CPC ......... *B01D 63/082* (2013.01); *B01D 61/147* (2013.01); *B01D 63/081* (2013.01);
(Continued)

(58) Field of Classification Search
CPC ............ B01D 2313/146; B01D 61/147; B01D 63/081; B01D 63/082; C02F 1/444; C02F 3/1273; Y02W 10/15
See application file for complete search history.

(56) References Cited

U.S. PATENT DOCUMENTS 5,482,625 A    1/1996 Shimizu et al.
5,681,438 A    10/1997 Proulx
(Continued)

FOREIGN PATENT DOCUMENTS

CN    1124174 A    6/1996
CN    1845782 A    10/2006
(Continued)

OTHER PUBLICATIONS

English translation of Japanese Patent Application No. 2004-255044 A (Sep. 2004).*
(Continued)

*Primary Examiner* — John Kim
(74) *Attorney, Agent, or Firm* — Birch, Stewart, Kolasch & Birch, LLP

(57) ABSTRACT

A filtration module includes a stack of at least two spacers. At least one spacer in the stack includes a first and a second outer plate and at least one internal permeate channel arranged in between the first and second outer plates such that the outer plates form two of the walls that define at least one internal permeate channel. The at least one internal permeate channel extends between two opposite side, other than the first and second outer plates, of the spacer. Moreover, the first and second outer plates of at least one spacer are porous or perforated and a filtration membrane is attached to the first and second outer plate of at least one spacer such that liquid transferred across the membrane is further transported through the pores or perforations to the at least one internal permeate channel. The spacers of the
(Continued)

stack are separated by separate elongated distance-pieces that are attached to the outer plates along the edge to the opposite sides between which the internal permeate channels extend, thereby forming filtrate channels between adjacent spacers in the stack, and wherein the filtrate channels extend in a direction other than the direction of the permeate channels. A method for producing a filtration module and a filtration device are also disclosed.

22 Claims, 4 Drawing Sheets

(51) Int. Cl.
  *C02F 1/44* (2006.01)
  *C02F 3/12* (2006.01)
(52) U.S. Cl.
  CPC ............ *C02F 1/444* (2013.01); *C02F 3/1273* (2013.01); *B01D 2313/146* (2013.01); *Y02W 10/15* (2015.05)

(56) References Cited

U.S. PATENT DOCUMENTS

| | | |
|---|---|---|
| 5,772,831 A | 6/1998 | Moro et al. |
| 7,678,273 B2 | 3/2010 | Harms et al. |
| 2008/0156730 A1 | 7/2008 | Heinen |
| 2010/0096317 A1 | 4/2010 | Morita |
| 2012/0038069 A1 | 2/2012 | Heinzl et al. |

FOREIGN PATENT DOCUMENTS

| | | |
|---|---|---|
| CN | 101541406 A | 9/2009 |
| EP | 0 624 238 A1 | 11/1994 |
| JP | 2004-255044 A | 9/2004 |
| RU | 2411068 C2 | 2/2011 |
| WO | WO 93/16346 A1 | 8/1993 |

OTHER PUBLICATIONS

English translation of the Russian Office Action and Search Report, dated Sep. 7, 2017, for Russian Application No. 2016131177.
English translations of the Chinese Office Action and Search Report, dated May 12, 2017, for Chinese Application No. 201580007790.9.

* cited by examiner

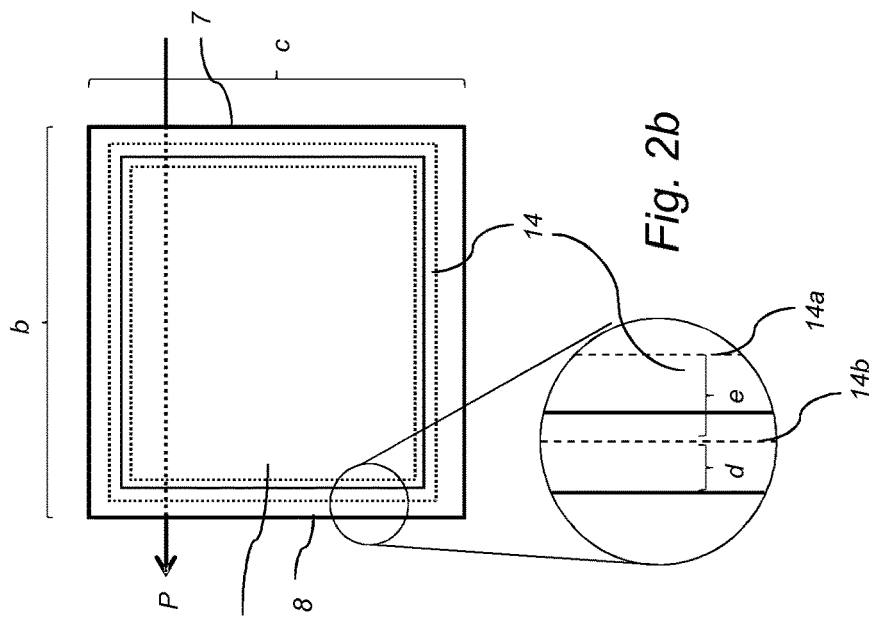
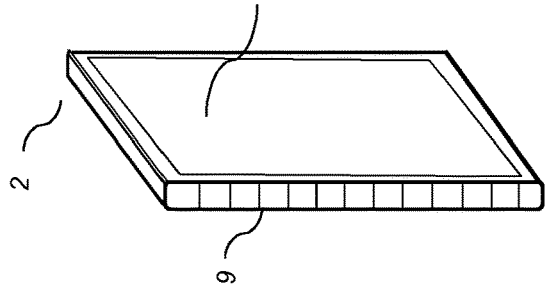
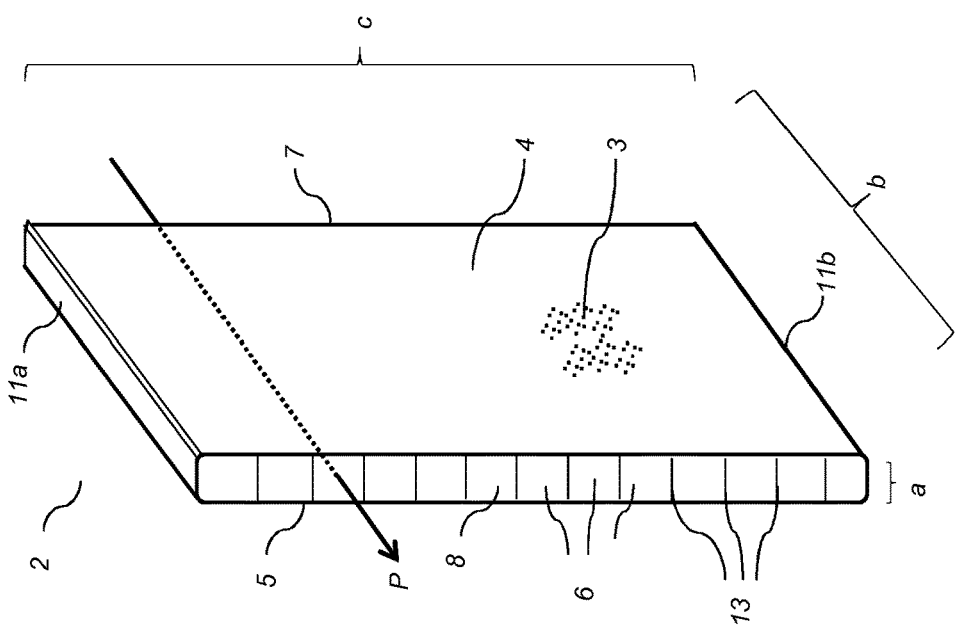

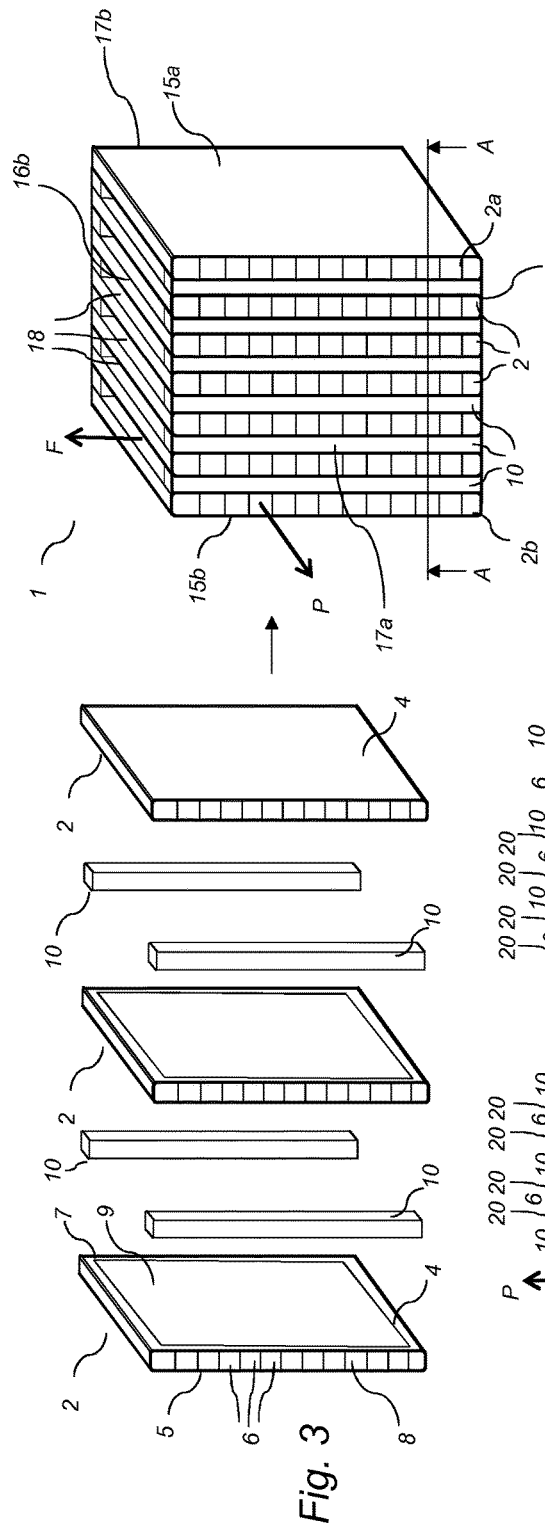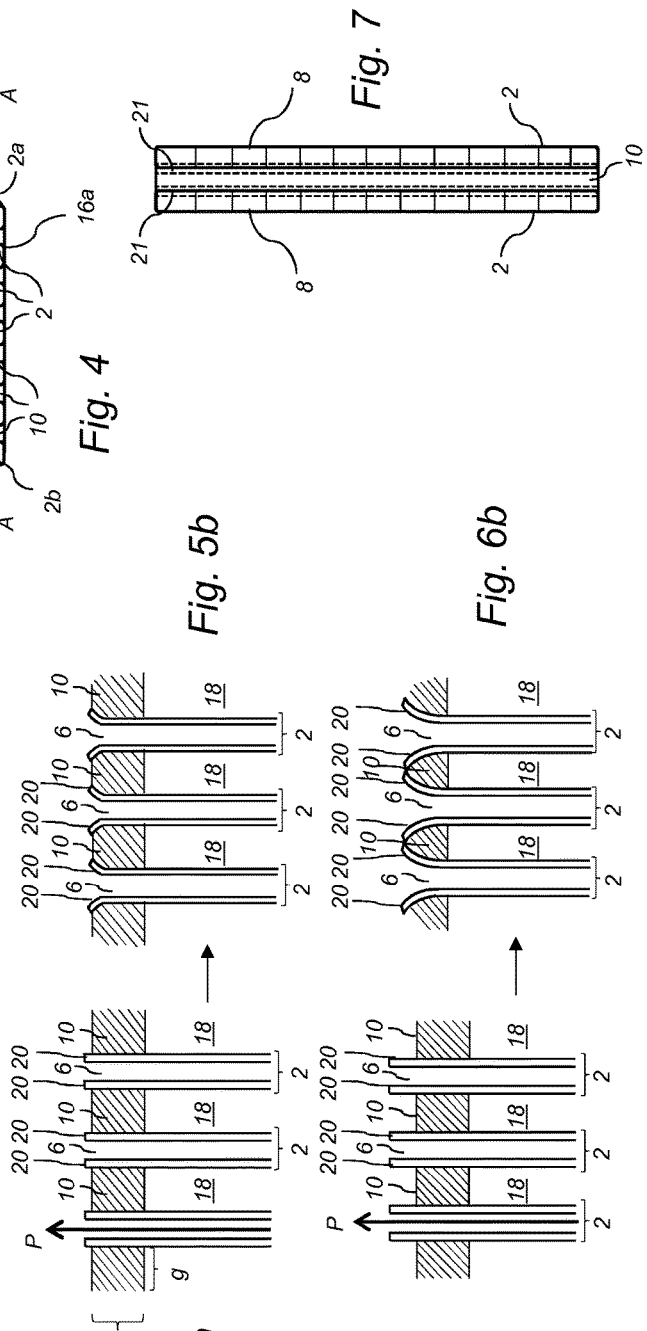

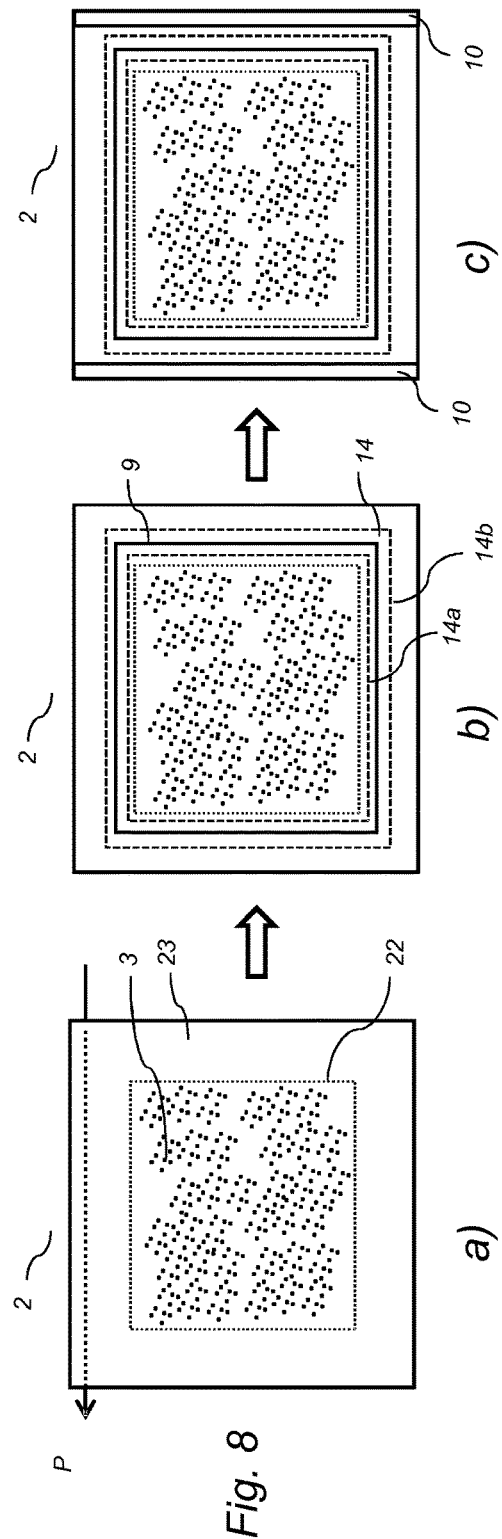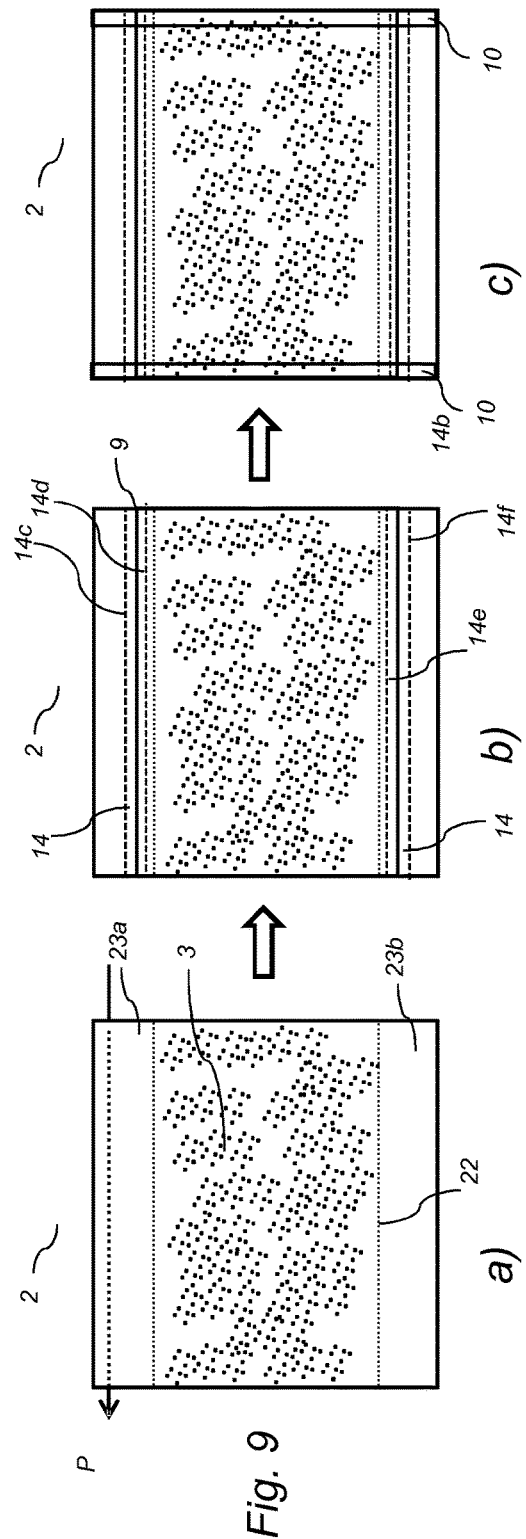

FILTRATION MODULE

FIELD OF THE INVENTION

The present invention relates to the field of microfiltration units which may be used e.g. for treating wastewater.

BACKGROUND OF THE INVENTION

Several processes may be used in the cleaning of waste water, depending on the type and the contaminants. One such technology is membrane treatment, which may be used for removal of dissolved species, organic compounds, human pathogens etc.

Membrane filtration is a physical separation process and the driving force is the pressure difference across the membrane. By using different membrane types, molecules of varying sizes may be separated. Membrane filtration may be used for microfiltration (MF), ultrafiltration (UF), nanofiltration (NF) and reverse osmosis (RO).

Membrane technologies is used in so called membrane bioreactors (MBRs), in which membranes e.g. are immersed in a tank (bioreactor) comprising the waste water to be treated. One consideration in MBR-technology is fouling of the membranes. Fouling is the result of interaction between the membrane and components of the waste water such as dead microorganism and soluble and/or colloidal compounds. Therefore, several MBRs are operated under cross-flow conditions, in which there is a flow of filtrate over the membrane in order to avoid build-up of solids on the membrane surface. This increases the performance of the membrane and increases the plant capacity.

A membrane bioreactor often includes several membranes in order to have as large membrane surface as possible. Membranes are usually attached to some sort of support, and water having passed the membrane (permeate) is led out from the MBR.

U.S. Pat. No. 7,678,273 discloses a filter unit comprising several membrane plates that are welded together at a small welding zone, manly for preventing leakage of concentrate to permeate in the unit.

US 2010/0096317 discloses a flat sheet membrane element for performing solid-liquid separation by immersion in a liquid. Collected permeate within the support plates for the filtration membranes is guided in a direction parallel to the direction of the liquid that is to be filtrated.

U.S. Pat. No. 5,482,625 discloses a filtration membrane module comprising several membrane supporting plates. The membrane supporting plate itself is manufactured by some sort of click-system to form permeate channels within the plate.

There is however a need in the art for improved and simplified methods of producing membrane units for a membrane bioreactor.

SUMMARY OF THE INVENTION

A main object of the present invention is to provide means that at least alleviates some of the above-mentioned problems.

A further object of the present invention is to provide a filtration module that is produced with simple manufacturing technologies. As a first aspect of the invention, there is provided a filtration module comprising a stack of at least two spacers, wherein at least one spacer in the stack comprises a first and a second outer plate and at least one internal permeate channel arranged in between the first and second outer plates such that the outer plates form two of the walls that define at the least one internal permeate channel, and further wherein said at least one internal permeate channel extend between two opposite sides, other than the first and second outer plates, of the spacer;

wherein the first and second outer plates of at least one spacer are porous or perforated and a filtration membrane is attached to said first and second outer plate of at least one spacer such that liquid transferred across the membrane is further transported through the pores or perforations to said at least one internal permeate channel;

and further wherein the spacers of the stack are separated by separate elongated distance-pieces that are attached to the outer plates along the edge to the opposite sides between which the internal permeate channels extend, thereby forming filtrate channels between adjacent spacers in the stack, and wherein the filtrate channels extend in a direction other than the direction of the permeate channels.

The filtration module may be used in a membrane bioreactor.

The filtration mod may further be used in different application other than in a membrane bioreactor, such as in wine and beer applications.

The filtration module may comprise a stack of at least two, such as at least three, such as at least ten, such as at least fifteen, spacers. However, the module may comprise at least twenty, such as at least fifty, such as at least eighty, such as at least hundred spacers in the stack.

The two end spacers in the stack may be similar to the other spacers in the stack. However, the end-spacers may be without perforations or may be shifted with solid plates.

The spacers may have a quadratic or rectangular form. The first and second outer plates are the outer sides of the spacer having the largest area of the sides of the spacer, and the first and second outer plates are opposite each other. In between the outer plates, internal permeate channels are arranged. The channels are thus sandwiched between the outer plates, and the outer plates form walls defining the permeate channels. The internal permeate channels may be through permeate channels that extend from a first to a second opposite sides. The permeate channels may thus be reached from the outside of the spacer, i.e. the opposite sides of a spacer between which the through permeate channels extend are open sides, meaning that the "entrances" to the permeate channels, or the ends of the permeate channels, are at the opposite sides.

The "two opposite sides" of the spacer between which the permeate channels extend are thus form other sides of the spacer than the outer plates. The "two opposite sides" may be substantially perpendicular to the first and second outer plates.

The spacer may comprise at least 5, such as at least 10, such as at least 15, such as at least 20, such as at least 25, such as at least 30 internal permeate channels. However, the spacer may comprise at least 50, such as at least 80, such as at least 100, such as at least 150, such as at least 200, such as at least 250, internal permeate channels.

The internal permeate channels may all extend in the same direction and may be parallel. The internal permeate channels may further be parallel to a side of the outer plate of the spacer. The permeate channels may thus extend in a direction (P) that is in the plane formed by a first or second outer plate. The channels may be formed by arranging corrugated sheets, pleated sheets, casted sheets, molded sheets, extruded sheets, sheets having ducts, sheets having cut or flat peaks or single distance aids between the first and second outer plates of the spacer.

At least one outer plate of at least one spacer is further porous or is perforated. The shape of pores or of perforations, the frequency of them or the amount can be adjusted depending of the pressure range, viscosity or temperature of the fluids. The perforations may be holes, slots, slits, or combinations thereof. The perforations may for example be funnel-shaped.

The perforations or pores themselves may thus function as a filter or membrane, depending on the size of the perforations or pores and the fluid that is to be filtered.

The fluids, which have passed the plates into the permeate channels, are defined as permeate.

A filtration membrane is further attached to the first and/or second outer plate of at least one spacer such that liquid transferred across the membrane s further transported through the pores or perforations to the at least one internal permeate channel.

The spacers of the filtration module thus function as a support for filtration membranes, and fluids that are able to pass the membrane further pass into the internal permeate channels via the pores or the perforations of the spacer.

Filtration membranes may be attached to both the first and second outer plate of the spacer. The membrane is attached to the outer surface of the plate of the spacer, i.e. the outer surface of the plate that is not facing the permeate channel.

For example, filtration membranes may be attached to both the first and second outer plate of the spacers in the stack forming the filtration module, except for the spacers forming the end-plates of the stack. On the end plates, filtration membranes may be attached only to the outer plate that is facing the rest of the spacers in the stack. However, the end-spacers may be without membranes.

Moreover, the plates of the stack forming the filtration module are separated by separate and elongated distance-pieces. The distance-pieces may be in the form of strips or bars or any similar shape. The distance-pieces are arranged such that they are in contact with an outer plate of a spacer and the outer plate of an adjacent spacer. The distance-pieces are attached along the edge between an outer plate and one of the two opposite sides between which the through permeate channels extend. "Along the edge" is supposed to mean both at the actual edge and close to the edge. Thus, a small distance may be left between the distance-piece and the edge.

The distance-pieces may be arranged such that the distance between adjacent spacers in the stack is less than 20 mm, such as less than 10 mm, such as about 5-8 mm.

The distance-pieces may be solid pieces of the same material as the spacers. The distance-pieces may for example comprise or consist of granulate material.

A distance-pieces being attached to the outer plates may be a distance-piece being glued or welded to the outer plates.

As an example, the distance-pieces may be attached to the outer plates along substantially the whole edges to the opposite sides between which the internal permeate channels extend. Thus, for example a weld or a glued string between the distance-piece and the spacer may extend throughout the whole side of a spacer. This provides for a robust and strong structure of the filtration module. Thus, two adjacent spacers may be spaced apart by two distance-pieces, such as by two distance-pieces in the form of strips. The distance-pieces may be elongated and arranged such that they are substantially parallel to the edge between the outer plate and one of the two opposite sides between which the through permeate channels extend.

The distance-pieces may be of the same material as the spacers, or they may be of a different material. The distance-pieces may for example be of a granulate material.

In the formed filtration module, the spacers are arranged such that the first outer plate of a spacer faces the second outer plate of an adjacent spacer.

Due to the distance-pieces between the spacers, filtrate channels are formed between spacers. Thus, the filtration module thus comprises a first channel system within the individual spacers, i.e. the internal permeate channels, and a second channel system between the spacers in the stack, i.e. the filtrate channels. This means that fluid that is to be treated, i.e. the filtrate, may thus flow through the filtrate channels, and the species having the ability to pass the outer plates of the spacers may flow into the permeate channels within the spacers. The "two opposite sides" may thus function as permeate collection sides, from which permeate flowing in the permeate channels may be collected.

The filtrate channels further extend in a direction (D) other than the direction (P) of the permeate channels. Thus, the flow in the filtrate channels may be in a first direction and the flow in the permeate channels may be in a second direction other than the first direction. As an example, the filtrate channels may extend in a direction that is substantially perpendicular to the direction of the permeate channels. The first aspect of the invention is based on the insight that the filtration module, i.e. the stack of spacers, may be formed by attaching separate distance-pieces along the edge between the outer plate and the sides between which the internal permeate channels extend. This facilitates the production of a membrane system, making the process much faster and more cost-effective than previous techniques for producing stacks of membrane plates used for membrane bioreactors. The filtration module may also be produced in large sizes, such as having a side that is at least more than 1 m, such as about 3 m in length. The system according to the first aspect of the invention further provides for a system very low permeate pressure drop.

The separate elongated distance pieces are advantageous in that they facilitate the formation of very large filtration modules, i.e. it is easy to scale up the filtration module. Further, the separate elongated distance pieces may be easy to manufacture, e.g. by means of extrusion if the distance-pieces are of a plastic material.

Moreover, it is advantageous to have the permeate channels extending in a direction other than the filtrate channels. This is because when in use, some sort of permeate collection device is attached to the outlets of the permeate channels to collect the permeate, and filter channels extending in another direction than the permeate channels thus facilitates free flow of liquid that is to be filtrated through the filtration module. As an example, if the filtrate channels extend in a direction that is substantially perpendicular to the direction of the permeate channels, which thus provides for free-flow filtrate channels and excellent through-flow of filtrate liquid through the filtration device.

Further, the filtration module provides for recirculation of a cleaning-in-place (CIP) liquid evenly on the permeate side, thereby providing a uniform cleaning of the membrane.

Due to the low-pressure drop in the filtration module it is possible to use nanofiltration membranes as filtration membranes in order to e.g. treat water with for the removal of divalent ions like calcium, magnesium etc., or low organic molecules like pesticides.

The low-pressure drop in the filtration module further facilitates applications in which only hydrostatic pressure is used to drive the flow through the membranes and through the internal permeate channels.

The spacers further provide excellent support for membranes, and the internal permeate channels allow a free flow, or a flow without formation of obstructions generating counter pressures, of fluids.

The filtration module may also be used for sterile filtration, clarification, or concentration of high molecule weight molecules. The filtration module may further be used for processing of vine, beer, fruit juice concentration, sterile filtration of milk. The size and number of the spacers may be adapted to the application and can be integrated in different configurations such as a membrane bioreactor (MBR) where the pressure drop on the permeate side has to be kept down to avoid the formation of a counter pressure, especially when high flux permeate rates are used.

The filtration module may be used for different types of constructions and including all pressure ranges, comprising micro filtration, ultra filtration, nanofiltration or reverse osmosis.

In embodiments of the first aspect of the invention, at least one spacer is an extruded spacer. For example, all spacers in the stack may be extruded spacers.

Thus, both the first and second outer plates, as well as the walls forming the internal permeate channels, may be an extruded spacer. The spacer may thus be a single piece. The internal permeate channels may thus have been formed by extrusion, walls of channel and spacer of the same material. The formed internal permeate channels are thus surrounded by extruded walls, in which two of the walls support a membrane.

This is advantageous in that it provides an effective backing to the filtration membranes and prevents distortion or damage thereto resulting from excessive pressure. For example, the walls of the permeate channel may be prevented from bending inwards due to in case of an increased pressure or membrane damage if a membrane is attached to the space. In short, the extruded support plate makes it possible to utilize the filtration device at higher pressure levels than comparable devices which consist only of an insert coupled direct to a filtration membrane.

All spacers of the filtration module may be of the same material.

In embodiments of the first aspect of the invention, at least one spacer is of a plastic material.

The spacer may for example be of a thermoplastic material, such as polypropylene (PP), polyethylene (PE), polyethylene terephthalate (PET), poly(vinyl chloride) (PVC), polysulfone (PSU), polyether ether ketone (PEEK), or any combination of these.

Thus, the first and second outer plates of the spacer, as well as the walls forming the internal permeate channels, may comprise or consist of a thermoplastic material. For example, the spacer may be an extruded spacer and of a thermoplastic material according to the above.

As an example, the filtration membrane is attached to the spacer by means of welding. The filtration membrane may for example be hot welded onto the first and/or second outer plate of the spacer. However, other types of welding may be used, such as ultrasonic welding, laser welding or IR-welding.

The membrane may be glued to the spacer or mechanically locked to the spacer.

In embodiments of the first aspect of the invention, at least one filtration membrane comprises polyvinylidene fluoride (PVDF), polystyrene (PS) or poly(ether sulfone) (PES), polypropylene (PP), polyethylene terephthalate (PET), or any combination of these.

Furthermore, the filtration membrane may have a porosity between 0.01-2 µm.

The filtration membranes may be membranes used for microfiltration, ultrafiltration, nanofiltration or reverse osmosis. Microfiltration is the coarsest of the membrane filtration classes. Ultrafiltration membranes are classified by the molecular weight cut off, which is defined as the molecular weight of the smallest molecule, 90% of which is retained by the membrane. Ultrafiltration range spans from 1000 to 500,000 molecular weight cut off. Nanofiltration membranes retain solute molecules having a molecular weight ranging from 100 to 1,000. Reverse osmosis involves the tightest membranes, which are capable of separating even smaller solute molecules compared to nanofiltration.

As an example, the plates of the spacer to which a membrane is attached may be perforated and the perforations may be funnel-shaped.

Thus, the perforations may be shaped as a funnel, or having a frusto-conical shape, and the perforations may thus have a large diameter at the filtrate side and a smaller diameter at the permeate side, i.e. the perforations may be arranged such that the larger diameter faces the membrane and the smaller diameter faces the internal permeate channel. This may be advantageous in case membrane damage appears, since sludge or other particles may be blocked by the funnel-shaped perforations without entering the internal permeate channels.

In embodiments of the first aspect of the invention, the distance-pieces are attached to the spacers by means of welding. The welding may comprise melting together the spacers and the distance-pieces.

The welding may for example be hot welding, ultrasonic welding, laser welding or IR welding. As an example, the spacers and the distance-pieces may be welded to each other such that the entrances to the internal permeate channels at the opposite sides of the spacer remain open.

This facilitates collection of the permeate fluid that has passed the membrane and flows in the permeate channels.

In embodiments of the first aspect of the invention, the distance-pieces were in the form of a powder prior to welding. This thus means that a powder or a granular material may have been applied to the outer plates prior to welding.

A single distance piece may also be in the form of a solid, elongated rod. This means that a single distance piece may be a solid bar, such as an extruded bar.

As a further example, a single distance piece may be a thick welding thread. Such a welding thread may be applied to the spacer using e.g. a standard plastic welding tool.

As an example, the distance-pieces may be of a polymeric material. As an example, the distance-pieces may comprise or consist of low-melting polypropylene (PP). This may facilitate welding the distance-piece to the outer plates.

Further, at least one spacer may be of a polymeric material, and the polymeric material of the spacer and the polymeric material of the distance-pieces may have substantially the same melting point.

As an example the at least one spacer and the distance-pieces comprises polypropylene (PP). The at least one spacer and the distance-pieces may thus consist of polypropylene (PP).

As an example, the distance-pieces may be of a color that absorbs more heat energy compared to the color of the at least one spacer.

As an example, the distance-pieces may be of a dark color, such as black, and the spacer material may be of a light color, such as white or transparent. This facilitates that the spacer melts to a lesser degree compared to the distance-pieces, which may facilitate that the permeate channels do not become deformed during welding. Further, a colorant, pigment or dye may be added to selected areas of the material that is to be welded so as to increase the heat-absorption from e.g. infra-red heating better in those selected areas.

As a further example, at least one spacer is of a polymeric material, and the polymeric material of the distance-pieces has a melting point that is below the melting point of the polymeric material of the spacer. This may thus also facilitate that the spacer melts to a lesser degree compared to the distance-pieces, which may facilitate that the permeate channels do not become deformed during welding. As an example, the at least on spacer comprises, or consists of, polypropylene (PP) and the distance-pieces may comprise polypropylene (PP) with polyimide (PI) as a melting point depressant.

Furthermore, the weld between the spacer and the distance-piece may be formed by melting of the distance-piece and the spacer such that the edges of the first and second outer plate of the spacers at the entrances to the internal permeate channels bend outwards and away from the entrance and towards the distance-pieces.

Thus, the distance-pieces and the spacer may be subjected to heating such that the edges of the first and second outer plate at the entrance to the permeate channels are brought to a molten state and thereby caused to bend outwards due to stresses in the material.

This means that for each internal permeate channel, two of the walls are bent outwards at both ends of the channel.

In embodiments of the first aspect of the invention, at least some of the formed welds between a distance-piece and a spacer overlap the membrane.

Thus, the welds between the distance-pieces and spacers may further aid in holding the filtration membrane at the right position.

For example, the edges of the first and second outer plate of the spacer may bend outwards to an extent such that they are in contact and have fused with edges of the first and/or second outer plate of an adjacent spacer.

Thus, each internal permeate channel may comprise two opposite walls, and one of the walls are in contact with a wall of a permeate channel located within an adjacent spacer, and the opposite wall is in contact with the wall of a permeate channel located on another adjacent spacer.

Such joints may both be tight and have good strength.

In embodiments of the first aspect of the invention, the distance-pieces are attached to the spacers by means of an adhesive. As an example, the adhesive may be a hot-melt adhesive.

A hot-melt adhesive refers to a thermoplastic adhesive that is usually arranged to be melted in a hot glue gun. The hot-melt adhesive may thus comprise polymers, such as ethylene-vinyl acetate copolymers, polyolefins polyamides, polyesters and/or polyurethanes.

When the distance-pieces are attached by means of an adhesive, the distance-pieces may be in the form of a powder prior attaching the distance-pieces with the adhesive, and the distance pieces may also be in the form of a solid, elongated rod, e.g. of a polymeric material, as discussed in relation to the welding embodiment above.

In embodiments of the first aspect of the invention, the filtration module is further comprising at least one permeate collection unit for collecting permeate from the permeate channels. The at least one permeate collection unit may welded to a side of the module at which the permeate channels end. Thus, the distance-pieces may be welded to the spacers and a permeate collection unit may be welded to the filtration module. This means that the distance-pieces, the spacers, and the permeate collection unit may be of a polymeric material, e.g. the same polymeric material. This thus provides a filtration module "cassette", of a single polymeric material, except for the filtration membranes themselves.

The permeate collection unit may comprise or consist of polypropylene. The present invention further provides a filtration module having only a single spacer sandwiched between two solid plates. The spacer may be attached to the plates by distance-pieces as discussed in relation to the first aspect above.

Further, as a configuration of the first aspect of the invention, there is provided a module comprising a stack of at least two spacers, wherein at least one spacer in the stack comprises a first and a second outer plate and at least one internal permeate channel arranged in between the first and second outer plates such that the outer plates form two of the walls that define at least one internal permeate channel and further wherein said at least one internal permeate channel extend between two opposite sides, other than the first and second outer plates, of the spacer;

and further wherein the spacers of the stack are separated by separate elongated distance-pieces that are attached to the outer plates along the edge to the opposite sides between which the internal permeate channels extend, thereby forming filtrate channels between adjacent spacers in the stack, and wherein the filtrate channels extend in a direction other than the direction of the permeate channels.

Thu, the present invention further relates to a module that does not comprise any filtration membrane. Such a module may be as discussed in relation to the module having a membrane above. A module that does not comprise the membrane may be useful in e.g. heat exchange applications.

As a second aspect of the invention, there is provided a method for producing a filtration module comprising the steps of a) providing at least two spacers, wherein at least one spacer comprises a first and a second outer plate and at least one internal permeate channel arranged in between the first and second outer plates such that the outer plates form two of the walls that define at least one internal permeate channel, and further wherein the at least one internal permeate channel extend between two opposite sides, other than the first and second outer plates, of the spacer; and wherein the first and/or second outer plates of at least one spacer are porous or perforated and wherein a filtration membrane (9) is attached to said first and second outer plate (4,5) of at least one spacer (2) such that liquid transferred across the membrane (9) is further transported through the pores or perforations to said at least one internal permeate channel (6);

b) arranging separate elongated distance-pieces between the spacers such that the distance-pieces are in contact with the outer plates of the spacers along the edge to the opposite sides between which the internal permeate channels extend, to form a stack of at least two spacers; and c) attaching the distance-pieces to the spacers to form the filtration module The terms and definitions used in relation to the second aspect are as defined in relation to the first aspect above.

Step a) may thus comprise providing spacers as described in relation to the first aspect above.

Step b) comprises assembling the spacers into a stack, or pack, that forms the filtration module prior to welding into one piece.

In embodiments of the second aspect, step c) comprises welding the distance-pieces and the spacers together along the whole opposite edges of the spacers such that the entrances to the internal permeate channels at the edges of the spacers remain open.

Consequently, step c) may comprise subjecting the edges of the spacers between which the permeate channels extend to radiation heat.

Step c) may thus comprise hot welding or laser welding. Step c) may comprise welding the distance-pieces and the spacers together along the whole opposite edges of the spacers such that the entrances to the internal permeate channels at the edges of the spacers remain open.

Step c) may comprise moving the stack of step b) past an apparatus which delivers radiation heat or thermal convection heat so as to heat the stack at the end surfaces thereof where the permeate channel ends are located. The permeate channel ends may be heated to an extent sufficient to bring the end portions of walls defining the permeate channels to a state at which they bend outwardly from one another.

However, step c) may also comprise gluing the distance-pieces to the spacers using a hotmelt adhesive.

Moreover, step a) may be preceded by the steps of a1) providing at least two spacers, wherein at least one spacer comprises a first and a second outer plate and at least one internal permeate channel arranged in between the first and second outer plates such that the outer plates form two of the walls that define at least one internal permeate channel, and further wherein the at least one internal permeate channel extend between two opposite sides, other than the first and second outer plates, of the spacer a2) perforating the first and/or second outer plates a3) attaching a filtration membrane to the perforated outer plate, thereby providing a spacer to which a filtration membrane is attached.

Attaching of the filtration membrane may be welding of filtration membrane to the outer plate of the spacer.

As a third aspect of the invention, there is provided a filtration device comprising a filtration module as defined in the first aspect of the invention above.

The filtration device may for example be a membrane bioreactor. The membrane bioreactor may e.g. comprise from one filtration module to several thousand filtration modules.

Furthermore, the membrane bioreactor may comprise means for collecting the permeate from the permeate channels. These means may comprise collection devices attached to the sides of the filtration modules. The membrane bioreactor may hold back sludge and only allow clear permeate to be collected.

The membrane bioreactor may further comprise a frame for fixation of the filtration modules and an aerator at the bottom for providing a cross-flow over the filtration modules. Trans-membrane pressure may for example be achieved by using gravity.

As a fourth aspect of the invention, there is provided the use of a membrane bioreactor according to the third aspect for treatment of waste water.

The membrane bioreactor may also be used for open sea for treatment of salty seawater, or in a treatment tank for other types of fluids in food industries, chemical plants, pulp and paper industries etc.

The present invention further provides a system comprising a tank for fluid to be treated, at least one membrane bioreactor immersed in the tank and means for transporting permeate collected from the membrane bioreactors to the outside of the system, such as to a collection tank. The means for transporting the permeate from the membrane bioreactors may be means for transporting the permeate by hydrostatic pressure. Then, the hydrostatic pressure may be used as the transmembrane pressure in the filtration modules.

BRIEF DESCRIPTION OF THE DRAWINGS

FIG. 1 shows a spacer.

FIGS. 2a and 2b show a spacer onto which a filtration membrane has been attached.

FIG. 3 shows an exploded view of a filtration module and how distance-pieces and spacers are arranged to form a stack of spacers.

FIG. 4 shows an assembled filtration module.

FIGS. 5a and 5b show an embodiment on how the weld between spacers and distance-pieces may be formed.

FIGS. 6a and 6b also show an embodiment on how the weld between spacers and distance-pieces may be formed.

FIG. 7 shows a side view of a part of a filtration module and the extension of the weld between distance-piece and spacer.

FIG. 8 schematically shows how a membrane may be welded to a spacer if the distance-pieces later are to be welded to the spacers.

FIG. 9 schematically shows how a membrane may be welded to a spacer if the distance-pieces later are to be glued to the spacers.

DETAILED DESCRIPTION

Figure 10:
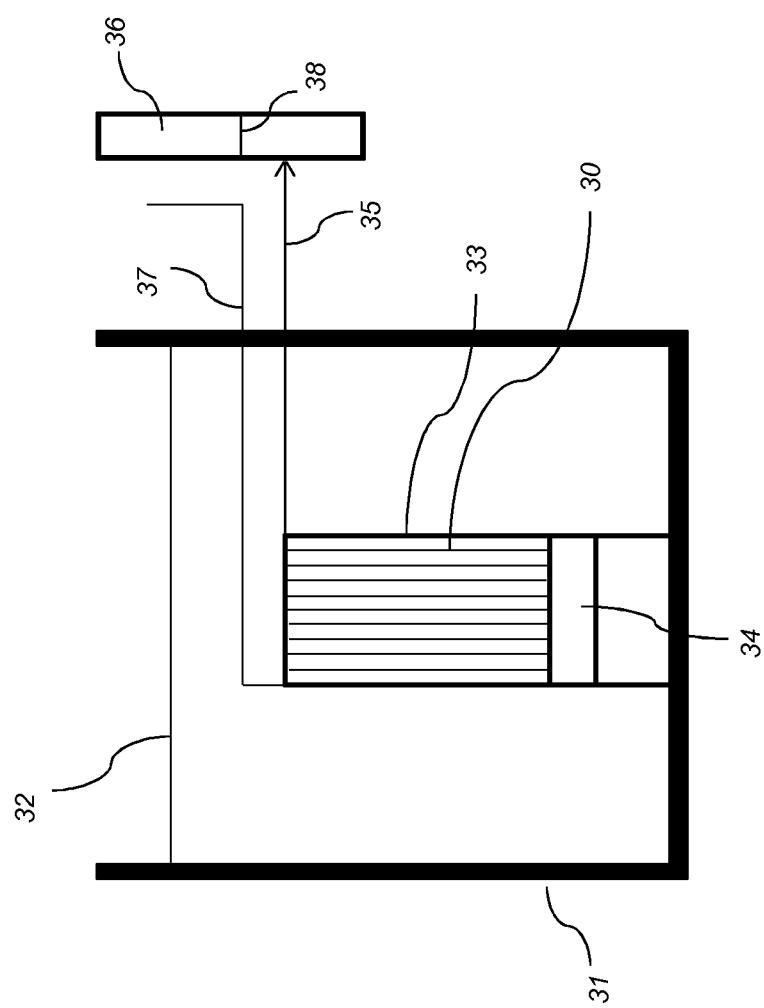
FIG. 10 schematically shows a membrane bioreactor in a tank.

The filtration module and method according to the present disclosure will be further illustrated by the following description of an embodiment with reference to the accompanying drawings.

FIG. 1 shows an individual spacer 2 of a filtration module 1. The spacer is rectangular and comprises a first 4 and second 5 outer plate. The first and second outer plates are perforated with perforations 3, and although only a few perforations are shown in FIG. 1, it is to be understood that substantially the whole first 4 and second 5 outer plates are perforated, except for a zone around the edge. This zone may be about 10 mm or 20 mm. The perforations 3 are made using a cold needle, giving a funnel-shaped hole with the small diameter in the bottom, i.e. at the entrance to the permeate channels 6.

Internal permeate channels 6 are arranged in between the first 4 and second outer plates 5. The permeate channels are substantially parallel to each other and parallel to sides 11a and 11b of the spacer 2. The first 4 and second 5 outer plates of the spacer 2, together with the walls 13 between individual permeate channels, thus form walls that define the permeate channels. The permeate channels are through permeate channels that extend between opposite sides 7 and 8 of the spacer, i.e. between sides that are perpendicular to the first 4 and second 5 outer plates. The ends of a permeate channels are thus located at an opposite side 7 and at an opposite side 8. The internal permeate channels thus extend in direction along arrow P. The opposite sides 7 and 8 are thus "open" sides, in that the internal permeate channels end at these sides, i.e. there is direct access to the permeate channels from the opposite sides 7 and 8. There is also access to the permeate channels 6 via perforations 3 of the first 4 and second 5 outer plates.

The upper 11a and lower side 11b of the spacer may be closed and have a rounded form. The upper and lower sides 11a, 11b are thus perpendicular to both the first 4 and second 5 outer plates as well to the open opposite sides 7 and 8 of the spacer 2.

The spacer 2 is an extruded spacer of a thermoplastic polymer, such as polypropylene.

Thus, both the first 4 and second 5 outer plates as well as the walls 13 in between are of an extruded single piece of thermoplastic polymer.

The length of rounded sides 11a and 11b, denoted b, may be about 150-250 mm, such as about 200 mm. Further, the length of the open opposite sides 7 and 8, denoted c, may be about the same, i.e. about 150-250 mm, such as about 200 mm. Accordingly, the first 4 and second 5 outer plate may have a dimension that is about 200 mm*200 mm. However, the size may also be larger, such as about 1000 mm*1000 mm. The thickness of the spacer, denoted a, i.e. the width of opposite sides 7 and 8, may be about 2.5-5 mm, such as about 3.5 mm.

FIG. 2a shows how a filtration membrane 9 is welded to the first 4 and second 5 outer plates of the spacer 2. FIG. 2b further shows a side view of the first side 4 of the spacer 2 of FIG. 2a. The membrane 9 has a rectangular form and is welded along all sides to the first outer plate 4 of the spacer. The membrane 9 has an area that is slightly smaller than the area of the first outer plate 4 of the spacer 2. The membrane 9 may have an area such that a "no-weld" zone is left between the membrane and the edges of the first outer plate 4. For example the width of this zone d may be about 0.5-2.5 mm, such as about 1.5 mm. The weld zone 14, having width e, extend all around the membrane and may have a width e that is about twice or about four times the width of the distance d. The weld zone 14 may thus have a width e that is about 1-8 mm, such as about 6 mm. The weld zone is formed between lines 14a and 14b, and the edge of the membrane 9 may be located between these lines. This weld zone may thus be a welding band around the edge and it may be combined with welding spots/lines on the membrane surface. However, the welding zone may also cover substantially the whole membrane surface, such as similar to laminating the membrane to the spacer. FIG. 3 shows an exploded view on a part of a filtration module 1. FIG. 3 thus further illustrates how distance-pieces 10 and spacers 2 are arranged form forming a stack. A formed filtration module is shown in FIG. 4.

Two separate elongated distance-pieces 10 in the form of rods are arranged between two adjacent spacers 2 and spacers are mutually stacked together. The distance-pieces have a length that is substantially equal the length c of a spacer (see FIG. 1). The distance pieces are in the same polymeric material as the spacers. However, the distance-pieces may be made of granulate that have been melted together to form a solid block or strip.

Spaces 10 are arranged at the edge between the first outer plate 4 and open side 8 of a spacer and at the edge between the first outer plate 4 and open side 7 of the same spacer 2, and an adjacent spacer 2 is then arranged such that its second outer plate contacts the distance-pieces, as seen in FIG. 3. Thus, in the stack a distance-piece 10 is in contact with the first outer plate of a spacer and with the second outer plate of an adjacent spacer.

The spacer 2a at the end of the stack has only a filtration membrane welded onto the second outer plate 5 and this outer plate is not perforated. In analogy, the spacer at the other end of the stack has only a filtration membrane welded onto the first outer plate 4, and this outer plate is not perforated. Thus, in the formed stack, there are nor filtration membranes on an outer plate of the stack.

A formed filtration module 1 is seen in FIG. 4. In this case, the stack comprises 7 spacers. The filtration module 1 comprises opposite sides 15a and 15b, opposite sides 16a and 16b, and opposite sides 17a and 17b.

The two opposite sides 15a and 15b consist of the first outer plate of the end spacer 2a and the second outer plate of the end spacer at the other end of the stack. The two opposite sides 17a and 17b are formed by the length of the distance-pieces 10 and the open opposite surfaces 7 and 8 respectively, of each individual spacer in the stack. Due to the arrangement of distance-pieces and spacers, filtration channels 18 are formed through the filtration module 1 between individual spacers 2. These filtration channels 18 extend in a direction shown by arrow F, i.e. between the opposite sides 16a and 16b of the formed filtration module 1. The filtration channels 18 are perpendicular to permeate channels 6 that extend in direction P. The filtration module thus comprises a first channel system for fluids, such has waste water, to be treated, i.e. the filtrate channels 18, and a second channel system for fluids having passed the filtration membranes, i.e. the permeate channels 6.

The filtration module 1 further comprises permeate collection means (not shown) for collecting the permeate from the permeate channels. These may be in the form of boxes that are mounted, e.g. welded, on one or both sides of the filtration module at which the permeate channels end.

In the filtration module of FIG. 4, the distance-pieces and the spacers are of the same polymeric material and the distance-pieces have been welded to the spacers, i.e. the spacers and the distance-pieces have*"melted together". In this embodiment, the distance-pieces are also of a darker color than the spacer, which means that they absorb more heat during irradiation with a heat source and consequently melts to a larger degree during welding as compared to the spacer. This may facilitate that the form of the permeate channels is not distorted to any significant degree during welding.

FIGS. 5 and 6 show two alternative embodiments on how the filtration module 1 is welded. Both FIGS. 5 and 6 show a part of a section of the filtration module cut along A-A in FIG. 4. More specifically, FIGS. 5 and 6 shows the end of the permeate channels at side 17a of the filtration module 1 for some of the spacers 2.

FIG. 5a shows a view before welding and how distance-pieces 10 are arranged at between spacer 2 and the side 17a of the stack of spacers 2. The distance-piece 10 is in contact with the first outer plate 4 of a first spacer 2c and with the second outer plate 5 of an adjacent spacer 2d. Thus the distance-pieces are arranged at the end of permeate channels 6.

The distance-pieces may have dimensions such that the width f is between 1 and 4 mm, such as about 2 mm, and the length g is between 5 and 10 mm, such as about 7 mm. Thus, individual spacers may be spaced apart by distance g, such as spaced apart by a length of 5-10 mm, such as about 7 mm.

The edges 20 of the first and second outer plate of the spacers at the entrances to the internal permeate channels form two of the walls defining the permeate channels 6.

Upon welding, the side 17a is e.g. irradiated with a heat source until the end-portions of the edges 20 defining two of the walls of permeate channels 6 are bent away from each other and towards the distance-piece 10. This may be the result from changes of the stresses present in the plastic material due to the heat treatment. The end result is illustrated in FIG. 5b.

FIG. 5b shows another embodiment on how the weld may be formed between distance-pieces 10 and spacers 2. In this case, the edges 20 bend outwards to an extent such that the edges meet the edges of an adjacent distance-piece. Thus, edge 2c of a spacer is in contact with edge 2d of an adjacent spacer, and the edge 2d is in contact with the edge 2c of the adjacent spacer on the other side, as shown in FIG. 6b.

The welds in as shown in FIG. 6b may for example be formed when the distance-pieces 10 are arranged at a distance from side 17a that is larger than the same distance in the embodiment of in FIG. 5a.

FIG. 7 shows a part of side 17a of the formed filtration module 1 of FIG. 4. FIG. 7 is to illustrate that the weld between the distance-piece 10 and the spacers 2 may be formed along the whole side of the spacer 2, i.e. the weld, illustrated by dotted weld zones 21, is formed along the whole side of the of a spacer at which the permeate channels end.

FIGS. 8 and 9 schematically show differences in how the spacer and membrane may be arranged if the distance-pieces are welded to the spacers (FIG. 8) and if the distance-pieces are attached to the spacers by means of a hot melt adhesive (FIG. 9). However, it is to be understood that the opposite is also possible, i.e. that welding the distance-pieces to the spacers may be performed as discussed in relation to FIG. 9, and attaching the distance-pieces to the spacer by means of a hot melt adhesive may be performed as discussed in relation to FIG. 8.

FIG. 8a shows a front view of spacer 2 that has been perforated. Arrow with direction P indicates the direction of the internal permeate channels. The perforations 3 are within a perforation zone 22, i.e. a non-perforated zone 23 extends along all edges of spacer 2. This zone may be about 10 mm wide. After perforation, a membrane 9 is welded to the spacer 2 (FIG. 8a, corresponding with FIG. 2b). The weld is formed between lines 14a and 14b, such that a weld zone 14 extends all around the membrane 9. The area of membrane 9 is smaller than the area of the spacer 2, but larger than the area of the perforated zone 22, and a no-weld zone is left between the membrane and the edges of the spacer 2 (corresponding to d in FIG. 2b). FIG. 8c shows how distance-pieces 10 are arranged, and later welded, to the spacer 2 to which a membrane 9 is attached. The distance-pieces 10 are in this embodiment made from melted granulate, which melts into the spacer 2 upon welding. Thus, the membrane 9 is welded to the spacer 2 also along the sides along which the distance-pieces 10 are later arranged.

FIG. 9a-c show an alternative embodiment in which the distance-pieces are attached to the spacer by means of a hot-melt adhesive. FIG. 9a shows a front view of spacer 2 that has been perforated. Arrow with direction P indicates the direction of the internal permeate channels. The perforations 3 are within a perforation zone 22 that extend along the full width b of spacer 2, leaving only an upper non-perforated strip 23a and a lower non-perforated strip 23b on the spacer along the edges that are parallel to the direction of the internal permeate channels. The perforated zone 22 in the embodiment of FIG. 9 may thus be larger than the perforated zone 22 of the embodiment of FIG. 8. When the membrane 9 is welded to the spacer, the membrane is only welded between lines 14c and 14d that are at the upper edge of the membrane to form an upper weld zone 14, and between lines 14e and 14f that are at the lower edge of the membrane (FIG. 9b) to form a lower weld zone 14. Thus, in contrast to the embodiment of FIG. 8, the membrane 9 is only welded along two sides to the spacer 2, and these sides are the sides that are perpendicular to the sides along which the distance-pieces 10 later are arranged. The membrane may also extend almost along the full width b, but however stop a short distance before the edges so that the spacer 2 is "visible" for the glue that is later applied. Consequently, a membrane having a larger area may be used compared to the embodiment shown in FIG. 8. The short distance may be in the order of a few mm, such as about 5 mm. Distance-pieces 10 are then arranged along the edges of the spacer 2, and a hot-melt adhesive is used to glue the distance-pieces 10 to the spacer 2. The glue width may be about 10-15 mm. The distance-pieces 10 is in this embodiment a solid material glued to the spacer, but could also be extruded fluted material similar to the spacer 2.

FIG. 10 schematically shows a membrane bioreactor (MBR) 30 immersed in a biological treatment tank 31 with liquid level 32. The liquid may for example be sewage water. It is to be understood that the tank 31 may comprise more than one MBR-unit. The MBR 30 comprises at least one filtration module according to the invention that is suspended in a frame part 33. The frame part 33 may be of stainless steel and/or plastic. The MBR further comprises permeate collection devices (not shown) for collecting permeate liquid from the internal permeate channels.

The membrane bioreactor 30 further comprises an aeration unit 34 below the filtration module for generating a cross-flow over the filtration modules. Generated permeate is collected by permeate collection tubes 35 and is led to a permeate tank 36. From tank 36, collected permeate may be withdrawn by other tubes/pipes etc. (not shown).

There is also cleaning-in-place (CIP) equipment (not shown) connected to the MBR for providing cleaning liquid via pipe 37 to the MBR 30. The CIP liquid may be circulated on the permeate side of the filtration module, pumping in the liquid in 37 and out in 35, or vice versa. By this way, a homogeneous distribution of the CIP liquid all over the membrane surface may be achieved.

The water level 38 in the permeate tank 36 is lower than the water level in the biological treatment tank 31. This water level difference is generating the hydrostatic pressure necessary to run the membrane system. The hydrostatic pressure can be regulated by the control of the water level in the permeate tank 36.

The invention is not limited to the embodiments disclosed above but may be varied and modified within the scope of the claims set out below.

The invention claimed is:

1. A filtration module comprising:
a stack of at least two spacers, wherein at least one spacer in the stack comprises a first outer plate and a second outer plate and at least one internal permeate channel arranged in between the first outer plate and second outer plate such that the first outer plate and second outer plate form two of the walls that define said at least one internal permeate channel, each outer plate having a first pair of edges extending in a first direction and a second pair of edges extending in a second direction, and wherein said at least one internal permeate channel extends in the first direction;
a porous or perforated area formed in each outer plate, the porous or perforated area being spaced from the first pair of edges; and a filtration membrane on each porous or perforated area such that liquid transferred across the membrane is transported through the pores or perforations to said at least one internal permeate channel, each filtration membrane having a first pair of edges extending in the first direction and a second pair of edges extending in the second direction, the filtration membrane being spaced from the first pair of edges of the outer plate, and wherein the spacers of the stack are separated by separate elongated distance-pieces that have a first surface contacting a first spacer and a second surface opposite the first surface contacting a second spacer, thereby forming a filtrate channel between the first spacer and the second spacer, and wherein the filtrate channel extends in a direction other than the direction of the internal permeate channels.

2. The filtration module according to claim 1, wherein the filtrate channel extends in the second direction that is substantially perpendicular to the first direction.

3. The filtration module according to claim 1, wherein at least one filtration membrane comprises polyvinylidene fluoride (PVDF), polystyrene (PS) or poly(ether sulfone) (PES), polypropylene (PP), polyethylene terephthalate (PET), or any combination thereof.

4. The filtration module according to claim 1, wherein the filtration membrane has a porosity between 0.01-2 µm.

5. The filtration module according to claim 1, wherein the distance-pieces are attached to the spacers by means of welding.

6. The filtration module according to claim 5, wherein the distance-pieces were in the form of a powder prior to welding.

7. The filtration module according to claim 6, wherein the weld between the spacer and the distance-piece is formed by melting of the distance-piece and the spacer such that the edges of the first and second outer plate of the spacers at the entrances to the internal permeate channels bend outwards and away from the entrance and towards the distance-pieces.

8. The filtration module according to claim 5, wherein the distance-pieces are made of a polymeric material.

9. The filtration module according to claim 8, wherein at least one spacer is of a polymeric material, and wherein the polymeric material of the spacer and the polymeric material of the distance-pieces have substantially the same melting point.

10. The filtration module according to claim 9, wherein the at least one spacer and the distance-pieces comprises polypropylene (PP).

11. The filtration module according to claim 9, wherein the distance-pieces are of a color that absorbs more heat energy compared to the color of the at least one spacer.

12. The filtration module according to claim 8, wherein at least one spacer is of a polymeric material, and wherein the polymeric material of the distance-pieces has a melting point that is below the melting point of the polymeric material of the spacer.

13. The filtration module according to claim 12, wherein the at least on spacer comprises polypropylene (PP) and the distance-pieces comprises polypropylene (PP) and polyimide (PI) as a melting point depressant.

14. The filtration module according to claim 5, wherein the spacers and the distance-pieces are welded to each other such that the entrances to the internal permeate channels at said opposite sides of the spacer remain open.

15. The filtration module according to claim 1, wherein the distance-pieces are attached to the spacers by means of an adhesive.

16. The filtration module according to claim 1, further comprising at least one permeate collection unit for collecting permeate from the permeate channels, and wherein the at least one permeate collection unit is welded to a side of the module at which the permeate channels end.

17. The filtration module according to claim 1, wherein the second pair of edges of the filtration membrane are spaced from the second pair of edges of the outer plate.

18. A filtration module comprising:
a stack of at least two spacers, wherein at least one spacer in the stack comprises a first and a second outer plate and at least one internal permeate channel arranged in between the first and second outer plates such that the first and second outer plates form two of the walls that define said at least one internal permeate channel, and wherein said at least one internal permeate channel extends between two opposite sides, other than the first and second outer plates, of the at least one spacer, wherein the first and second outer plates of the at least one spacer are porous or perforated and a filtration membrane is attached to said first and second outer plates of the at least one spacer such that liquid transferred across the membrane is transported through the pores or perforations to said at least one internal permeate channel, wherein the spacers of the stack are separated by separate elongated distance-pieces that are attached to the first and second outer plates along edges thereof to the two opposite sides between which the internal permeate channels extend, thereby forming filtrate channels between adjacent spacers in the stack, and wherein the filtrate channels extend in a direction other than the direction of the internal permeate channels, and wherein the edges of the first and second outer plate of the spacer bend outwards to an extent such that they are in contact and are fused with edges of the first and/or second outer plate of an adjacent spacer.

19. A method for producing a filtration module comprising the steps of:
providing at least two spacers, wherein at least one spacer comprises a first outer plate and a second outer plate and at least one internal permeate channel arranged in between the first outer plate and second outer plate such that the first outer plate and second outer plate form two of the walls that define at least one internal permeate channel, each outer plate having a first pair of edges extending in a first direction and a second pair of edges extending in a second direction, and wherein said at least one internal permeate channel extends in the first direction forming a porous or perforated area in each outer plate, the porous or perforated area being spaced from the first pair of edges;

attaching a filtration membrane to each porous or perforated area such that liquid transferred across the membrane is further transported through the pores or perforations to said at least one internal permeate channel, the filtration membrane being spaced from the first pair of edges;

arranging separate elongated distance-pieces between said spacers such that the distance-pieces have a first surface contacting a first spacer and a second surface opposite the first surface contacting a second spacer, forming a filtrate channel between the first spacer and the second spacer, to form a stack of at least two spacers; and attaching the distance-pieces to the spacers to form said filtration module.

20. The method according to claim 19, wherein attaching the distance-pieces to the spacers comprises welding the distance-pieces and the spacers together along the whole opposite edges of said spacers such that the entrances to the internal permeate channels at the edges of the spacers remain open.

21. The method according to claim 19, wherein attaching the distance-pieces to the spacers comprises gluing the distance-pieces to the spacers using a hotmelt adhesive.

22. A filtration device comprising the filtration module as defined in claim 1.

* * * * *